Sept. 30, 1930.  D. G. MACKENZIE  1,777,007
ENGINE CONSTRUCTION
Filed April 8, 1929  3 Sheets-Sheet 1
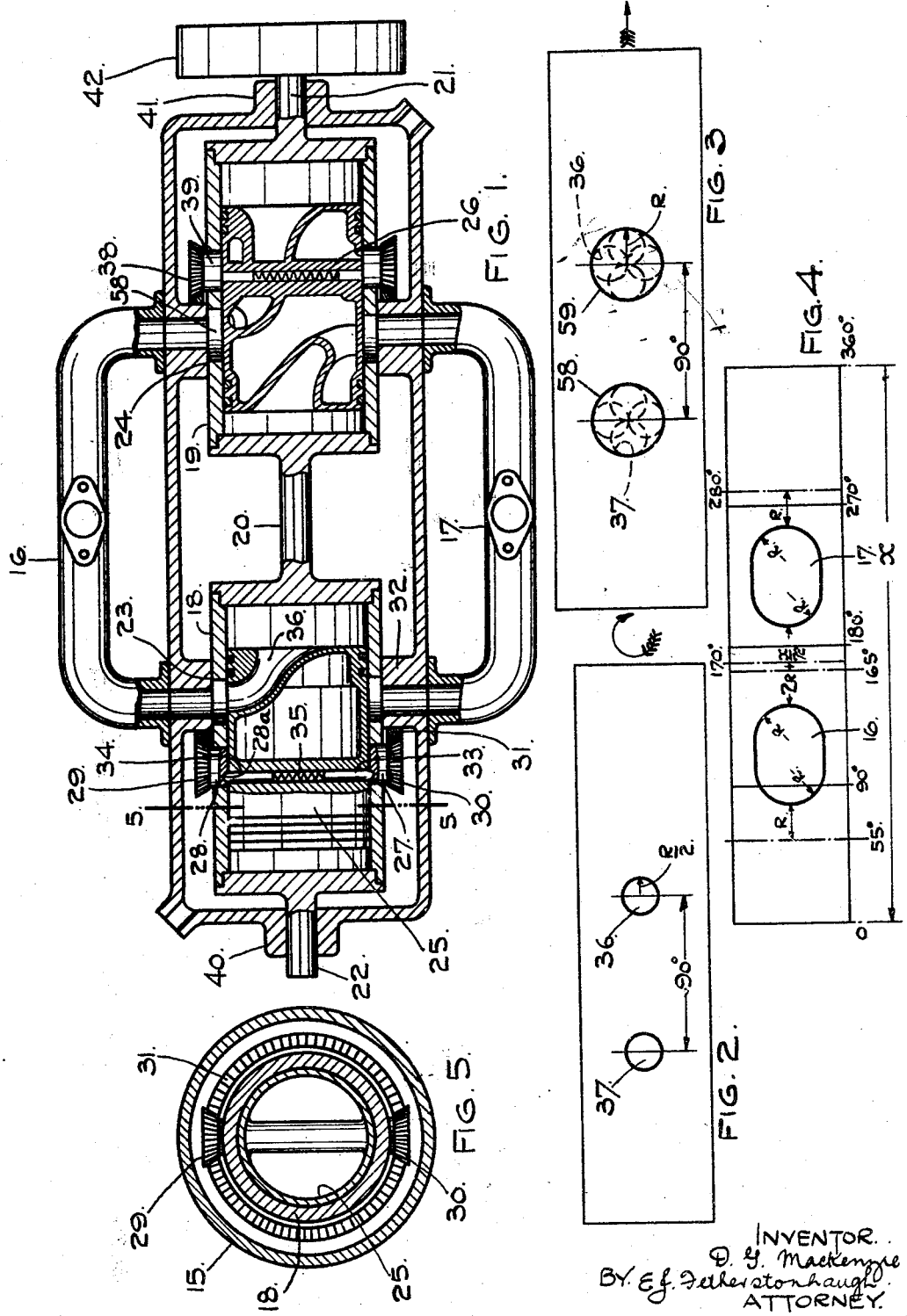

Sept. 30, 1930.   D. G. MACKENZIE   1,777,007
ENGINE CONSTRUCTION
Filed April 8, 1929   3 Sheets-Sheet 2
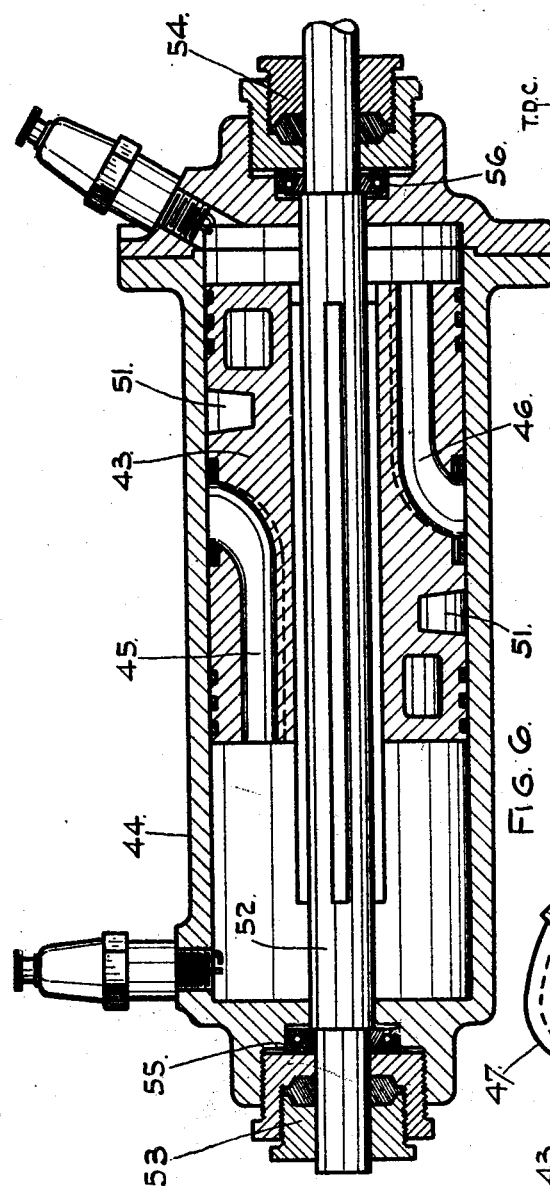
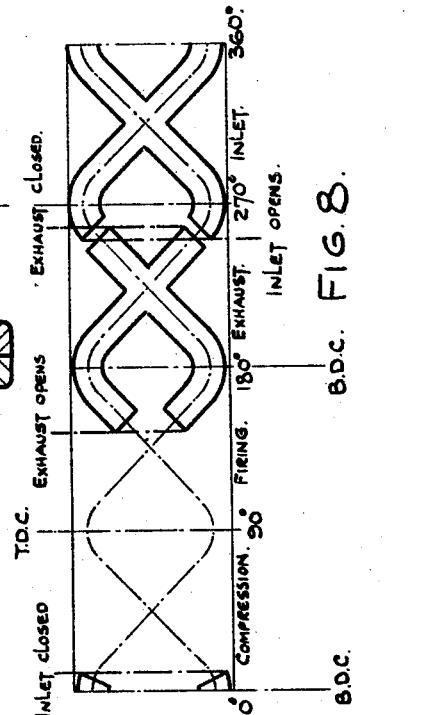
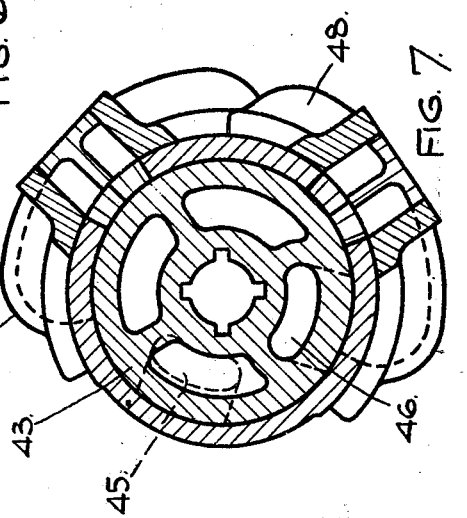
INVENTOR.
D. G. Mackenzie.
BY E.J. Fetherstonhaugh
ATTORNEY.

Sept. 30, 1930.  D. G. MACKENZIE  1,777,007
ENGINE CONSTRUCTION
Filed April 8, 1929  3 Sheets-Sheet 3

INVENTOR.
D. G. Mackenzie.
BY E. J. Featherstonhaugh
ATTORNEY.

Patented Sept. 30, 1930

1,777,007

UNITED STATES PATENT OFFICE

DONALD GORDON MACKENZIE, OF WESTMOUNT, QUEBEC, CANADA, ASSIGNOR TO DON-MAC PRODUCTS CORPORATION, OF NEW YORK, N. Y., A CORPORATION OF DELAWARE

ENGINE CONSTRUCTION

Application filed April 8, 1929. Serial No. 353,594.

The invention relates to engine construction, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to reduce the weight per unit of power produced, lessen the frontal area and eliminate obstructive features in the body of the motor, thereby minimizing the effect of wind resistance and adding to the buoyancy in aircraft; as well as increasing the speed thereof; to facilitate the application of power to other conveyances; to construct a motor having a low shaft speed with the power characteristics of one operated at a high speed; to contribute to the efficiency of the engine by the utilization of oscillatory and compound rotatory motions which coincidently inject and discharge the driving medium at the correct times and operate the pistons without encumbering the machine with customary valves and valve cams and operating mechanisms; and generally to provide in a small compass a prime mover of unusually high power per unit weight having also great advantages in regard to the cost of production and of maintenance and simplicity in construction.

There are many forms and applications of this principle, the following are given as examples of possible and practical applications.

In the drawings, Figure 1 is a longitudinal sectional view of the preferable form of motor, showing the means employed for effecting the rotary movement.

Figure 2 is a plan view of the piston ports of the form of the invention illustrated in Figure 1, showing the piston periphery extended or produced.

Figure 3 is a plan view of the sleeve cylinder ports in the form of the invention illustrated in Figure 1, showing the piston periphery extended or produced.

Figure 4 is a plan view of the casing ports, in the form of the invention illustrated in Figure 1, showing the piston periphery extended or produced.

Figure 5 is a cross sectional view on the line 5—5 in Figure 1.

Figure 6 is a longitudinal sectional view of a modified form of motor showing the inlets and outlets in this form of piston.

Figure 7 is a cross sectional view of the form of the invention illustrated in Figure 2.

Figure 8 is a diagrammatic view showing the operation of the fluid in relation to the piston valve ports illustrated in Figures 2 and 3.

Like numerals of reference indicate corresponding parts in the various figures.

Figure 9:
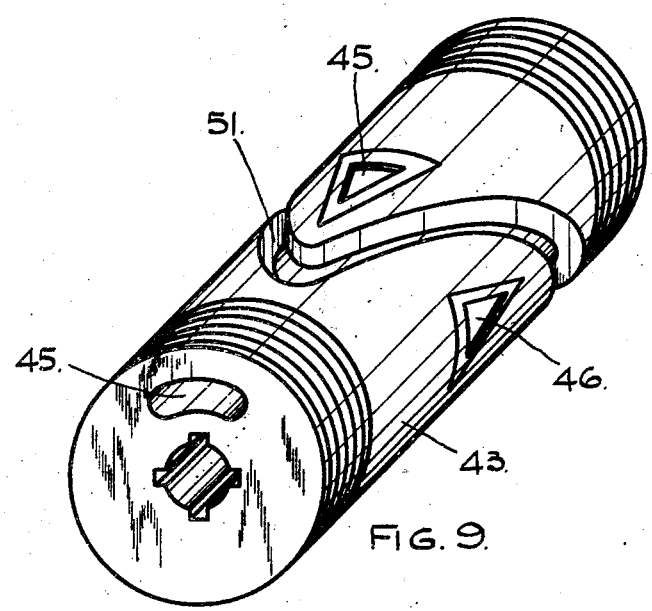
Figure 9 is a perspective detail of the piston illustrated in Figure 6.
Figure 10:
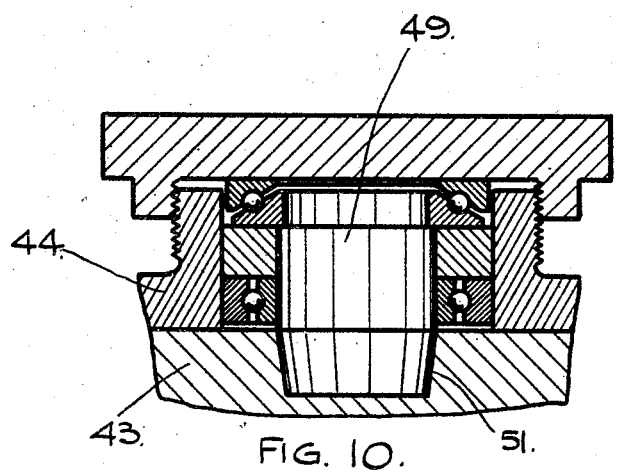
Figure 10 is a detail of a lug and thrust bearings.

In describing the invention, its particular use has been emphasized in connection with certain types of engines, but there are features indicative of a principle, which may be practically applied in many directions and in this connection it may be said that one outstanding feature is the mechanical movement disclosed in Figure 1, and which is shown as applied to a particular form of engine construction, in order to give a clear understanding of its operation.

Referring to the drawings, and particularly to Figures 1–5 the engine illustrated is formed of an outer cylindrical casing, indicated by the numeral 15, having manifolds and the ports 16 and 17 for the introduction and exhaust of the operating gas, vapour or fluid.

In an internal combustion engine this may be gas, gasoline vapours, or other form of fuel oil vapours.

In hydraulic pumps, a motor would be of a fluid nature and in that type of motor commonly called Diesel a liquid or oil is injected through suitable ports to combine with air separately introduced thereinto.

The cylinders 18 and 19 are in sleeve form and are connected by the shaft 20, and have the shafts 21 and 22 extending from the ends respectively. These cylinders 18 and 19 rotate in the bearings 23 and 24 in the interior of said casing, and respectively contain the pistons 25 and 26 which reciprocate and rotate coincidently.

The ports 16 and 17 extend through the casing to the walls of the cylinders 18 and 19 and coincide with the ports 58 and 59 at proper intervals. The ports 31 and 37 are smaller than the ports 58 and 59 having about half the diameter, this is in order to accommodate the spherical movement of the pistons 25 and 26 with reference to the cylinders 18 and 19 and is incidental to the sleeve adjustment of these moving parts in this mechanical movement in relation to the rotating cylinders.

The disks 27 and 28 are journalled in the walls of the cylinder 18 at diametrically opposite points, and these disks are extended outwardly to form the bevel gears 29 and 30 which mesh with the circular rack 31, which is rigidly secured to the inwardly extending flange 32.

The piston is operatively connected to the disks 27 and 28 through the pins 33 and 34 these pins having ball ends extending into radially arranged corresponding sockets 28ᵃ in the disks 27 and 28 and spring-held in said sockets 28ᵃ by the spring 35, the said disks, pins and gears approximating a crank mechanism.

This piston 25 is formed with ports 36 and 37 cooperating with the aforesaid cylinder ports 58 and 59 but of smaller diameter to insure registering therewith, notwithstanding self adjusting movements of the moving parts due to the gyratory movements, thus making possible in conjunction with the rotation of the cylinders 18 and 19 the intake and the proper distribution of the exhaust and permitting the sealing of the chambers during compression and power strokes.

In regard to the cylinder 19, a similar gear mechanism 38 is applied and operated by exactly the same form of crank mechanism 39, but set 90° later than that just described.

The shafts 21 and 22 are shown as journalled in the bearings 40 and 41 and suitable stuffing boxes are provided to retain the lubricant and cooling fluid in the casing.

The casing 15 is the equivalent of the crank chamber cooling jacket and valve seat, and provides the bearings for the rotation of the sleeves or cylinders 18 or 19 and an enclosure for the gear mechanism utilized in driving these cylinders through the reciprocation of the pistons, this casing containing the combination of a cooling and lubricating medium circulated and cooled in any of the well known methods of today.

It will be seen that in the operation of this mechanical movement the pistons 25 and 26 and the cylinders 18 and 19 constitute two two cylinder double acting engines with the equivalent of a four cycle movement carried out in each revolution of the shaft 22, that is to say, the piston oscillates four times per revolution of the shaft 22, other combinations are quite possible, so that it will be realized that this mechanism makes it feasible to obtain any desired crank speed and yet retain the well known advantages of high speed operation without the use of any external gear reductions or other weight increasing mechanism.

The reciprocation of the pistons 25 and 26 operates the novel telescopic crank mechanisms and this rotates the bevel gears meshed with the circular racks, these bevel gears are journalled in the cylinders 18 and 19 so that their rotary movements cause a rotation of the cylinders thereby rotating the shafts 21 and 22, the shaft 22 carrying the flywheel 42 which are necessary accessories for the successful operation of any motor.

Another application of this principle is shown in Figure 6, the piston 43 reciprocates in the elongated cylinder 44 and also rotates. This piston 43 is formed with the passages and ports 45 opening into the cylinder 44 at end end, and out through the cylinder wall at the other end, and with the passages and ports 46 opening into the cylinder at the opposite end and out through the cylinder wall.

It may be explained briefly that the operation of the shaft 22 depends entirely on the rotation of the cylinders 18 and 19 and that these revolve is due to the reciprocation of the pistons 25 and 26 which through the gears 29 and 30 and the stationary gears 31 are kept constantly revolving during their reciprocatory movements, that is to say, a piston stroke throws a pin forwardly and the return stroke throws a pin rearwardly, thus completing the rotation of the disks 27 and 28 and accomplishing a corresponding distance of travel on the stationary of the disk gears that carry the cylinders therewith. During this rotation the ports open and close as already explained.

The manifolds 47 and 48 are arranged on the outside of the wall of the cylinder 44, and are so placed and so arranged that the rotation of the piston 43 brings them into register with the ports 45 and 46 coincidently with the termination of the several strokes, as for example, at the conclusion of the firing stroke or explosion stroke, the gas is compressed in the explosion chamber at the other end of the piston and is in turn fired, which exhausts the burnt gases from previous explosion.

There is now an idle stroke, in which, in the chamber where the first explosion occurred the gas is sucked in, which is commonly called suction stroke, and the burnt gases from the second explosion are expelled.

The gas is now compressed in the original explosion chamber and fired, and the same cycle of operations continues.

Now when this is all going on, the passages 45 and 46 opening out through the sides of the cylinders into the manifolds 47 and 48 are timed by the rotation to meet these several strokes of the piston, so as to afford gas for the suction stroke and to afford clear passage for the exhaust.

The piston 43 is rotated in this modified form of the invention by means of the lugs 49 extending into the spiral grooves 51 in the wall of the piston, thereby, during reciprocation guiding the piston in its rotatory course and rotating the shaft 52, which is keyed to said piston and extends outwardly through the packing glands 53 and 54 and the thrust bearings 55 and 56.

It is known that the rotation of cylindrical bodies by spiral grooves or slots and guiding lugs is quite old in the art and therefore only the specific features in relation thereto may be considered as peculiar to this and novel. The valve form of piston in connection wtih the rotatory and reciprocatory movements is of course very important and also the mechanical movements hereinbefore set forth in detail.

What I claim is:—

1. In a device of the kind described, a mechanical movement comprising a frame, a rotatory cylindrical member, a crank and spherical gear mechanism, mounted in said frame and in said cylindrical member respectively and a reciprocatory member mounted in said cylindrical member operating the crank mechanism to rotate said cylindrical member through the coaction of said gear mechanism with said crank mechanism by means of spherical motion.

2. In engine construction, an elongated cylindrical casing having inlet and exhaust manifolds and cylinder bearings, cylinders journalled in said bearings having shaft connections and extensions journalled in said cylinder casing, crank mechanism journalled in said cylinders and gears operated thereby, stationary circular gears engaged by the aforesaid gears and pistons reciprocating in said cylinders and operatively connected to said cranks.

3. In engine construction, an elongated cylindrical casing having cylinder bearings and shaft bearings, cylinders rotating about their own axes in said bearings and having shaft extensions therefrom, journalled in said shaft bearings, pistons reciprocating in said rotary cylinders and spherical gear mechanisms operatively connected with said pistons.

4. In engine construction, an elongated cylindrical casing having cylinder bearings and shaft bearings, cylinders rotating about their own axes in extended line formation journalled in said bearings, circular racks secured within said cylindrical casing and encircling said cylinders, gears running on said racks, pistons reciprocating in said cylinders and crank mechanism operated by the reciprocation of said pistons and operatively connected with said gears running on said racks.

5. In engine construction, an elongated casing suitably split having inlet and outlet ports and forming cylinder and shaft bearings, cylinders journalled in said bearings having shaft extensions therefrom, cranks in disc form journalled in said cylinders and extending in each instance into a bevel gear, stationary bevel gears rigidly secured within said casing and meshing with the aforesaid ports opening out through said revolving cylinders into said casing ports and operatively connected through telescopic crank pins with said disc cranks.

6. In engine construction, a rotary cylinder journalled in suitable bearings and having disc cranks journalled in the walls thereof and bevel gears extending from said discs, a piston reciprocating in said cylinder, sliding crank pins from said piston having ball ends extending in the corresponding recesses in said disc crank arms and spring-held in said recesses and a circular stationary bevel gear meshing with the aforesaid bevel gears in the travel of the latter around said stationary gear through the reciprocation of said piston and the rotation of said discs.

Signed at Montreal, Canada, this 16th day of March, 1929.

DONALD GORDON MACKENZIE.